(12) United States Patent
Yamashita et al.

(10) Patent No.: US 10,899,070 B2
(45) Date of Patent: Jan. 26, 2021

(54) FILAMENT FOR MATERIAL EXTRUSION-TYPE THREE-DIMENSIONAL PRINTERS, WOUND BODY COMPOSED OF SAID FILAMENT, CARTRIDGE CONTAINING SAID FILAMENT, AND METHOD FOR PRODUCING RESIN MOLDED ARTICLE USING SAID FILAMENT

(71) Applicant: MITSUBISHI CHEMICAL CORPORATION, Tokyo (JP)

(72) Inventors: Kosei Yamashita, Tokyo (JP); Shigeyuki Furomoto, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 448 days.

(21) Appl. No.: 15/809,630

(22) Filed: Nov. 10, 2017

(65) Prior Publication Data

US 2018/0065294 A1    Mar. 8, 2018

Related U.S. Application Data

(63) Continuation of application No. PCT/JP2016/064017, filed on May 11, 2016.

(30) Foreign Application Priority Data

May 13, 2015   (JP) ................. 2015-098368

(51) Int. Cl.
| | |
|---|---|
| *B65D 85/04* | (2006.01) |
| *B65H 55/00* | (2006.01) |
| *C08G 63/181* | (2006.01) |
| *D01F 6/62* | (2006.01) |
| *B29C 64/118* | (2017.01) |
| *B33Y 70/00* | (2020.01) |
| *B33Y 10/00* | (2015.01) |
| *C08G 63/127* | (2006.01) |
| *B29C 64/321* | (2017.01) |
| *C08G 63/183* | (2006.01) |
| *D01F 6/84* | (2006.01) |
| *B29L 31/00* | (2006.01) |
| *B29K 67/00* | (2006.01) |
| *B29K 105/00* | (2006.01) |

(52) U.S. Cl.
CPC .......... *B29C 64/118* (2017.08); *B29C 64/321* (2017.08); *B33Y 10/00* (2014.12); *B33Y 70/00* (2014.12); *C08G 63/127* (2013.01); *C08G 63/183* (2013.01); *D01F 6/84* (2013.01); *B29K 2067/00* (2013.01); *B29K 2105/0032* (2013.01); *B29K 2995/0026* (2013.01); *B29L 2031/731* (2013.01); *B65H 2701/313* (2013.01); *B65H 2701/3132* (2013.01)

(58) Field of Classification Search
CPC ............... B29C 64/118; B29K 2067/00; B29L 2031/731; B65D 85/04; B65H 55/00; B65H 2701/313; B65H 2701/3132; C08G 63/181; C08G 63/183; D01F 6/62
USPC ............. 264/308, 331.21; 206/389; 242/159; 428/401; 528/308, 308.1, 308.2, 308.6
See application file for complete search history.

(56) References Cited

U.S. PATENT DOCUMENTS

| | | | |
|---|---|---|---|
| 4,600,764 A | 7/1986 | Dicke et al. | |
| 5,648,449 A * | 7/1997 | Tai ..................... | C07C 43/23 528/308.6 X |
| 5,968,429 A | 10/1999 | Treece et al. | |
| 6,722,872 B1 | 4/2004 | Swanson et al. | |
| 2004/0101642 A1 | 5/2004 | Quillen et al. | |
| 2004/0231555 A1* | 11/2004 | Pavlin .............. | C09D 11/34 106/31.43 |
| 2009/0295032 A1 | 12/2009 | Hopkins | |
| 2014/0167091 A1 | 6/2014 | Ogasawara et al. | |
| 2016/0177078 A1 | 6/2016 | Naito et al. | |
| 2016/0185050 A1* | 6/2016 | Topolkaraev ...... | B29C 64/118 264/308 |
| 2018/0009160 A1 | 1/2018 | Sawada et al. | |

FOREIGN PATENT DOCUMENTS

| | | |
|---|---|---|
| CN | 1982372 A | 6/2007 |
| CN | 103717673 A | 4/2014 |
| CN | 103980672 A | 8/2014 |
| CN | 104629272 A | 5/2015 |
| GB | 1033809 A | 6/1966 |

(Continued)

OTHER PUBLICATIONS

Extended European Search Report dated Apr. 3, 2018 for the corresponding European Patent Application No. 16792720.1.
Database WPI, Week 200420, Thomson Scientific, London, GB; AN 2004-205728, (2004).
Office Action dated Jan. 3, 2019 for the related Chinese Patent Application No. 201680027305.9.
Chinese Office Action dated Aug. 23, 2019 for the corresponding Chinese Patent Application No. 201680027305.9.
International Search Report dated Jul. 26, 2016 for the corresponding PCT Application No. PCT/JP2016/064017.

(Continued)

*Primary Examiner* — Leo B Tentoni
(74) *Attorney, Agent, or Firm* — Leason Ellis LLP

(57) ABSTRACT

An object of the invention is to provide a filament for a material extrusion-type three-dimensional printer, which filament contains an aromatic polyester resin, and which overcomes the shortcomings of a filament for a material extrusion-type three-dimensional printer that is composed of an ABS resin. Provided is a filament for a material extrusion-type three-dimensional printer, the filament including an aromatic polyester resin containing 50 mol % or more of aromatic dicarboxylic acid units, and 3 mol % or more of isophthalic acid units, with respect to the total amount of dicarboxylic acid units. The aromatic polyester resin preferably has a melt flow rate (230° C., 2.16 kgf) of 7 g/10 min or more, and an intrinsic viscosity of 0.80 dL/g or less.

11 Claims, 1 Drawing Sheet

(56) References Cited

FOREIGN PATENT DOCUMENTS

| | | |
|---|---|---|
| JP | 60-235833 A | 11/1985 |
| JP | 0617315 A | 1/1994 |
| JP | 2001-516297 A | 9/2001 |
| JP | 2002-020470 A | 1/2002 |
| JP | 2003-502184 A | 1/2003 |
| JP | 2003-129332 A | 5/2003 |
| JP | 2003-534159 A | 11/2003 |
| JP | 2006-283251 A | 10/2006 |
| JP | 2007-084648 A | 4/2007 |
| JP | 2010-521339 A | 6/2010 |
| JP | 2012-180433 A | 9/2012 |
| JP | 2014-201660 A | 10/2014 |
| JP | 2017-030346 A | 2/2017 |
| WO | WO-01/089814 A1 | 11/2001 |
| WO | WO-2015/019212 A1 | 2/2015 |
| WO | WO-2015/037574 A1 | 3/2015 |
| WO | WO-2015/064877 A1 | 5/2015 |

OTHER PUBLICATIONS

Notification of Transmittal of Translation of the International Preliminary Report on Patentability dated Nov. 23, 2017 for the corresponding PCT Application No. PCT/JP2016/064017.
Chinese Office Action dated Feb. 25, 2020 for the corresponding Chinese Patent Application No. 201680027305.9.
Japanese Office Action dated Sep. 25, 2018 for the corresponding Japanese Patent Application No. 2015-098368.
Chinese Office Action dated Jun. 2, 2020 for the corresponding Chinese Patent Application No. 201680027305.9.

\* cited by examiner

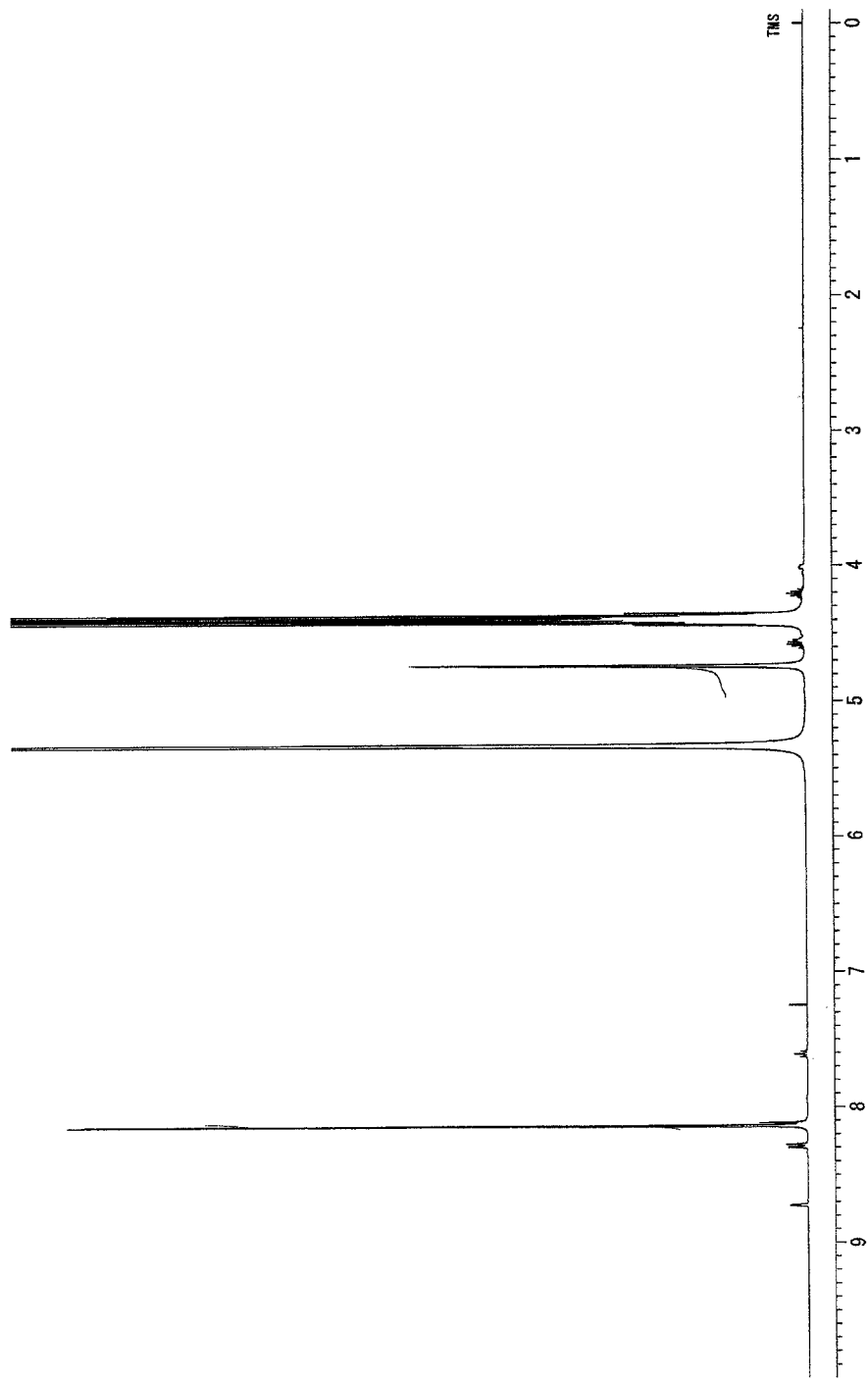

FILAMENT FOR MATERIAL EXTRUSION-TYPE THREE-DIMENSIONAL PRINTERS, WOUND BODY COMPOSED OF SAID FILAMENT, CARTRIDGE CONTAINING SAID FILAMENT, AND METHOD FOR PRODUCING RESIN MOLDED ARTICLE USING SAID FILAMENT

CROSS-REFERENCE TO RELATED APPLICATION

This is a continuation of International Application No. PCT/JP2016/064017, filed on May 11, 2016, and designated the U.S., and claims priority from Japanese Patent Application No. 2015-098368 which was filed on May 13, 2015, the entire contents of which are incorporated herein by reference.

TECHNICAL FIELD

The present invention relates to a filament for a material extrusion-type three-dimensional printer. More specifically, the present invention relates to: a filament for a material extrusion-type three-dimensional printer, which filament contains a specific aromatic polyester resin, and which is used for producing a resin molded article by a material extrusion-type three-dimensional printer; a roll of the filament; a cartridge including the filament; a resin molded article produced using the filament for a material extrusion-type three-dimensional printer; and a method of producing the same.

BACKGROUND ART

Three-dimensional printers (hereinafter, sometimes referred to as "3D printers") based on various types of additive manufacturing technologies (such as binder injection technology, material extrusion technology, vat photopolymerization technology, and the like) are commercially available today. Among these, a Material Extrusion—type 3D printer system (such as a system provided by Stratasys Incorporated in United States) is used for constructing a three-dimensional object in layers, by extruding a raw material having fluidity through a nozzle portion provided at an extrusion head, based on a computer aided design (CAD) model.

The above described system (sometimes referred to as "Fused Deposition Modeling method" or "FDM method") is a simple system, and thus has been widely used. Specifically, in the FDM method: a filament composed of a thermoplastic resin as a raw material is inserted into an extrusion head, and while being heat melted, the filament is continuously extruded onto a X-Y plane of a substrate included in a chamber, through a nozzle portion provided at the extrusion head; then the extruded resin is allowed to deposit on the already-deposited resin laminate so as to be fusion bonded therewith; and the resultant is solidified as an integrated object as it cools. In the FDM method, in general, the above mentioned extrusion step is repeated while elevating the position of the nozzle relative to the substrate in the direction of Z axis, which is perpendicular to the X-Y plane, thereby constructing a three-dimensional object which resembles a CAD model (Patent Document 1).

Conventionally, an acrylonitrile-butadiene-styrene resin (hereinafter, sometimes referred to as "ABS resin") has generally been used, as a raw material for use in the FDM method, in terms of extrudability and the like (Patent Document 2).

PRIOR ART DOCUMENTS

Patent Documents

Patent Document 1: JP 2003-502184 A
Patent Document 2: JP 2010-521339 A

SUMMARY OF THE INVENTION

Problems to be Solved by the Invention

In recent years, 3D printers are gaining popularity not only in industrial applications, but also among individual consumers, and are more easily usable. Accordingly, a 3D printer is demanded to have a capability to produce a resin molded article not only with a high forming accuracy, but also with high design properties and the like.

However, a filament for a material extrusion-type 3D printer which is composed of an ABS resin and used in a conventional common 3D printer has problems such as follows: the filament is opaque due to containing a rubber component, and thus, it is unable to impart an intended color to the filament by incorporating a coloring agent; an odor occurs when heat melting the filament; heating during the extrusion causes an increase in the viscosity of the resin, making the nozzle susceptible to occlusion; and the like. Improvements in these problems are demanded.

In order to solve the problems associated with the above described filament for a material extrusion-type 3D printer, which is composed of an ABS resin, the use of polyethylene terephthalate (PET) can be considered. However, when the intrinsic viscosity of PET is decreased in order to secure its fluidity, PET becomes more susceptible to crystallization, making it difficult to obtain a transparent laminated product. Thus, PET is considered to be unusable as a resin for preparing a filament for a material extrusion-type 3D printer.

An object of the present invention is to provide a filament for a material extrusion-type 3D printer, which filament has an excellent transparency, which is capable of being imparted with an intended color vividly by incorporating a coloring agent, and which can be used at a wide range of forming temperatures and forming speeds.

Means for Solving the Problems

The present inventors have found out that it is possible to solve the above mentioned problems by using an aromatic polyester resin containing specific structural units in a filament for a material extrusion-type three-dimensional printer, thereby completing the present invention. The gist of the present invention may be the following [1] to [11].

[1] A filament for a material extrusion-type three-dimensional printer, the filament comprising an aromatic polyester resin containing 50 mol % or more of aromatic dicarboxylic acid units, and 3 mol % or more of isophthalic acid units, with respect to the total amount of dicarboxylic acid units.

[2] The filament for a material extrusion-type three-dimensional printer according to [1], wherein the aromatic polyester resin comprises 50 mol % or more of ethylene glycol units with respect to the total amount of diol units.

[3] The filament for a material extrusion-type three-dimensional printer according to [1] or [2], wherein the aromatic polyester resin comprises 3 mol % or more and 50 mol % or less of isophthalic acid units with respect to the total amount of dicarboxylic acid units.

[4] The filament for a material extrusion-type three-dimensional printer according to any one of [1] to [3], wherein the aromatic polyester resin has a melt flow rate (230° C., 2.16 kgf) of 7 g/10 min or more and 100 g/10 min or less.

[5] The filament for a material extrusion-type three-dimensional printer according to any one of [1] to [4], wherein the aromatic polyester resin has an intrinsic viscosity of 0.80 dL/g or less.

[6] The filament for a material extrusion-type three-dimensional printer according to any one of [1] to [5], wherein the filament has a diameter of 1.0 mm or more and 5.0 mm or less.

[7] A roll of filament obtainable by winding the filament for a material extrusion-type three-dimensional printer according to any one of [1] to [6].

[8] A cartridge for a material extrusion-type three-dimensional printer, the cartridge comprising: a container; and the filament for a material extrusion-type three-dimensional printer according to any one of [1] to [6] or the roll of filament according to [7] housed within the container.

[9] A method of producing a resin molded article, wherein the resin molded article is produced by a material extrusion-type three-dimensional printer, using the filament for a material extrusion-type three-dimensional printer according to any one of [1] to [6].

[10] A filament for a material extrusion-type three-dimensional printer, the filament comprising an aromatic polyester resin containing terephthalic acid units and isophthalic acid units as dicarboxylic acid units.

[11] The filament for a material extrusion-type three-dimensional printer according to [10], wherein the aromatic polyester resin comprises ethylene glycol units as diol units.

Further, the gist of the present invention may also be the following [12] and [13], or [14] and [15]. [12] A method of producing a resin molded article, the method comprising the steps of:

preparing an aromatic polyester resin containing 50 mol % or more of aromatic dicarboxylic acid units, and 3 mol % or more of isophthalic acid units, with respect to the total amount of dicarboxylic acid units; and forming a resin molded article by a material extrusion-type three-dimensional printer, using the aromatic polyester resin as a raw material.

[13] A method of producing a resin molded article, the method comprising the steps of:

preparing an aromatic polyester resin containing terephthalic acid units and isophthalic acid units as dicarboxylic acid units; and forming a resin molded article by a material extrusion-type three-dimensional printer, using the aromatic polyester resin as a raw material.

[14] Use of an aromatic polyester resin containing 50 mol % or more of aromatic dicarboxylic acid units, and 3 mol % or more of isophthalic acid units, with respect to the total amount of dicarboxylic acid units, as a filament for a material extrusion-type three-dimensional printer.

[15] Use of an aromatic polyester resin containing terephthalic acid units and isophthalic acid units as dicarboxylic acid units, as a filament for a material extrusion-type three-dimensional printer.

Effect of the Invention

The filament for a material extrusion-type 3D printer according to the present invention has the following excellent characteristics:

(1) The filament has an excellent transparency, and can be imparted with an intended color vividly by incorporating a coloring agent;
(2) The filament can be used at a wide range of forming temperatures and forming speeds; and
(3) The filament is less likely to cause an occlusion of a nozzle, since heating during the extrusion does not cause an increase in the viscosity.

In particular, the present invention allows for providing a filament for a material extrusion-type 3D printer, which filament has a further improved transparency due to the effects of amorphousness and slow crystallization properties, provided by incorporating a specified amount isophthalic acid units, and which is capable of being extrusion molded at a low temperature due to the material resin having a lower melting point, and thus has an excellent convenience.

BRIEF DESCRIPTION OF THE DRAWING

The FIGURE shows a $^1$H-NMR spectrum chart of a filament obtained in Example 2.

MODE FOR CARRYING OUT THE INVENTION

Embodiments of the present invention will be described below in detail. The present invention is not limited to the following description, and modifications can be made arbitrarily, without departing from the gist of the present invention. Note that, in the present specification, an expression of a range including the phrase "from * to *", with numerical values or physical property values provided before and after the "to", is used to mean that the values before and after the "to" are included in the range.

[Aromatic Polyester Resin Contained in Filament for Material Extrusion-Type 3D Printer]

The filament for a material extrusion-type 3D printer according to the present embodiment includes an aromatic polyester resin containing 50 mol % or more of aromatic dicarboxylic acid units, and 3 mol % or more of isophthalic acid units, with respect to the total amount of dicarboxylic acid units.

Further, the filament for a material extrusion-type 3D printer according to another embodiment includes an aromatic polyester resin containing terephthalic acid units and isophthalic acid units as dicarboxylic acid units.

A polyester resin is a polymer or a copolymer obtained by a condensation reaction of: a dicarboxylic acid component comprising a dicarboxylic acid or a reactive derivative thereof; and a diol component comprising a diol or an ester derivative thereof, as main components.

In one embodiment, the aromatic polyester resin (hereinafter, sometimes referred to as the "aromatic polyester resin according to the present embodiment) contains 50 mol % or more of aromatic dicarboxylic acid units, and 3 mol % or more of isophthalic acid units, with respect to the total amount of dicarboxylic acid units included in the resin.

Note that the contents of aromatic dicarboxylic acid units and isophthalic acid units in the aromatic polyester resin are values measured by $^1$H-NMR spectroscopy as described below. Further, the contents of terephthalic acid units, ethylene glycol units and the like, in the aromatic polyester resin are also values measured by $^1$H-NMR spectroscopy as described below.

A quantity of from 13 to 25 mg of aromatic polyester resin pellets is weighed, and dissolved in 1 ml of a solution of CDCl$_3$ (deuterated chloroform)/HFIP (hexafluoroisopropanol)=7/3 (v/v), followed by adding thereto 25 μL of deuterated pyridine. The resultant is then transferred to an NMR test tube having an outer diameter of 5 mm. The $^1$H-NMR spectrum of the resulting solution was measured, using AVANCE 400 spectrometer manufactured by Bruker Corporation. The measurement was carried out under the following conditions: a resonance frequency of 400.1 MHz, a flip angle of 45°, a data acquiring time of four seconds, a pulse repeating time of 10 seconds, a cumulative number of 64 times, and a temperature of room temperature. TMS signal at 0.00 ppm was used as a standard for chemical shift. From the integral values thereby obtained, the amounts of aromatic carboxylic acids such as isophthalic acid and terephthalic acid are calculated. The amounts of diols, such as ethylene glycol and cyclohexanedimethanol to be described later, can also be measured in the same manner.

The aromatic polyester resin can be obtained, for example, by using as dicarboxylic acids and/or reactive derivatives thereof which are raw materials of the aromatic polyester resin, 50 mol % or more of aromatic dicarboxylic acids and/or reactive derivatives thereof, and 3 mol % or more of isophthalic acid and/or a reactive derivative thereof, with respect to the total dicarboxylic acid component in the raw materials. The "dicarboxylic acid units" as used herein refer to structural units which are derived from a dicarboxylic acid(s) and/or a derivative(s) thereof used in the production of the aromatic polyester resin, and which are introduced into the aromatic polyester resin. Likewise, structural units which are derived from a diol(s) or an ester derivative(s) thereof used in the production of the aromatic polyester resin, and which are introduced into the aromatic polyester resin, are referred to as "diol units". Further, units derived from isophthalic acid, terephthalic acid and the like, which are types of dicarboxylic acids, and units derived from ethylene glycol, butylene glycol and the like, which are types of diols, are referred to as "isophthalic acid units" and the like, respectively, in the same manner.

Examples of aromatic dicarboxylic acids which can be used as raw materials for the aromatic polyester resin include: terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenyletherdicarboxylic acid, 4,4'-biphenylmethanedicarboxylic acid, 4,4'-biphenylsulfonedicarboxylic acid, 4,4'-biphenylisopropylidenedicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid, 2,5-pyridinedicarboxylic acid, and the like. Substitution compounds (for example, alkyl-substitution compounds such as 5-methylisophthalic acid), reactive derivatives (for example, alkyl ester derivatives such as dimethyl terephthalate and diethyl terephthalate), and the like of the above described dicarboxylic acids can also be used. The aromatic polyester resin needs to contain isophthalic acid and/or a reactive derivative thereof as an essential component(s), among the above described aromatic dicarboxylic acids, and may further contain one of the above singly, or two or more of these as a mixture.

Among the above described aromatic dicarboxylic acids, preferred as aromatic dicarboxylic acids and/or reactive derivatives thereof other than isophthalic acid and/or a reactive derivative thereof, which can be used as raw materials for the aromatic polyester resin, are terephthalic acid, 2,6-naphthalenedicarboxylic acid and alkyl ester derivatives thereof, and particularly preferred are terephthalic acid and an alkyl ester derivative thereof. Further, as a reactive derivative of isophthalic acid, an alkyl ester derivative of isophthalic acid is preferred.

It is preferred that the aromatic polyester resin contain 3 mol % or more of isophthalic acid units with respect to the total amount of dicarboxylic acid units, and further contain terephthalic acid units and/or naphthalenedicarboxylic acid units in such an amount(s) that the total amount of the isophthalic acid units and the terephthalic acid units and/or naphthalenedicarboxylic acid units is 50 mol % or more with respect to the total amount of dicarboxylic acid units. In particular, it is preferred that the aromatic polyester resin contain the above amount of isophthalic acid units, and further contain terephthalic acid units in such an amount that the total amount of the isophthalic acid units and the terephthalic acid units is 50 mol % or more with respect to the total amount of dicarboxylic acid units.

The content of aromatic dicarboxylic acid units in the total dicarboxylic acid units is preferably 50 mol % or more, and the upper limit thereof is not particularly limited, but usually 100 mol % or less.

Further, the content of isophthalic acid units in the total dicarboxylic acid units is preferably 10 mol % or more, and the upper limit thereof is not particularly limited, but usually 50 mol % or less.

In terms of transparency and fluidity, the aromatic polyester resin is preferably a copolymerized aromatic polyester resin which contains terephthalic acid units in an amount of from 50 to 90 mol %, particularly from 60 to 90 mol %, and isophthalic acid units in an amount of from 10 to 50 mol %, particularly from 10 to 40 mol %, with respect to the total amount of dicarboxylic acid units.

When the content of the isophthalic acid units in the aromatic polyester resin is less than the above described lower limit, a sufficient effect of improving the transparency and the fluidity cannot be obtained. When the content exceeds the above described upper limit, on the other hand, formability by a material extrusion-type 3D printer tends to decrease.

The aromatic polyester resin may contain any of other types of dicarboxylic acid units other than the above described aromatic dicarboxylic acid units, to the extent that the object of the present invention is not impaired. In such a case, the other type(s) of dicarboxylic acid units may be, for example, one or more types of: aliphatic dicarboxylic acid units such as adipic acid, azelaic acid, sebacic acid, and dodecane dioic acid; and alicyclic dicarboxylic acid units such as cyclohexane dicarboxylic acid.

Examples of diols which can be used as raw materials for the aromatic polyester resin include: aliphatic diols such as ethylene glycol, diethylene glycol, 1,2-propylene glycol, 1,3-propanediol, triethylene glycol, 1,4-butanediol, neopentyl glycol, 1,5-pentanediol, 1,6-hexanediol, decamethylene glycol, and 2,2-dimethyl-1,3-propanediol; alicyclic diols such as 1,4-cyclohexanedimethanol, 1,3-cyclohexanedimethanol, cyclohexanediol, and trans- and cis-2,2,4,4-tetramethyl-1,3-cyclobutanediol; aromatic diols such as p-xylenediol, bisphenol A, tetrabromobisphenol A, and tetrabromobisphenol A-bis(2-hydroxyethylether); and the like. Substitution compounds thereof can also be used. Among these, ethylene glycol, 1,4-butanediol, and 1,4-cyclohexanedimethanol are preferred, and ethylene glycol is more preferred, in terms of heat resistance, dimensional stability and the like. These may be used singly, or in combination of two or more kinds. In addition, as the diol component, one or more of long chain diols having a molecular weight of from 400 to 6,000, namely, polyethylene glycol, poly-1,3-propylene glycol, polytetramethylene glycol and the like, can be used in combination with the above described diols, to be copolymerized.

In terms of transparency, heat resistance, and dimensional stability, the aromatic polyester resin preferably contains 50 mol % or more of ethylene glycol units, with respect to the total amount of diol units. In particular, the content of ethylene glycol is preferably from 50 to 100 mol %, and particularly preferably from 80 to 100 mol %.

The method of producing the aromatic polyester resin is not particularly limited, and is produced according to an ordinary method. Specifically, the aromatic polyester resin can be produced by reacting the dicarboxylic acid component and the diol component as raw materials while heating, in the presence of a polycondensation catalyst containing titanium, germanium, antimony or the like, and by discharging by-produced water or a lower alcohol out of the system. In the production, either a batch polymerization method or a continuous polymerization method can be used. It is also possible to use a solid phase polymerization method to increase the degree of polymerization.

The aromatic polyester resin preferably has a melt flow rate (MFR), as measured at a temperature of 230° C. and a load of 2.16 kgf, of 7 g/10 min or more. When the MFR as described above is 7 g/10 min or more, the resulting resin will have a sufficient fluidity, and thus a good formability, in the production of a resin molded article by a material extrusion-type 3D printer. In terms of the formability by a material extrusion-type 3D printer, the MFR of the aromatic polyester resin is more preferably 10 g/10 min or more, and still more preferably 12 g/10 min or more. On the other hand, in terms of the stability of the diameter of the extruded strand, the upper limit of the MFR is usually 200 g/10 min or less, and preferably 100 g/10 min or less.

The MFR of the aromatic polyester resin can be controlled by adjusting the introduction ratio of isophthalic acid units as a copolymerization component, the intrinsic viscosity of the resin, and the like.

The molecular weight of the aromatic polyester resin can be expressed by the intrinsic viscosity (IV) of the resin, and the intrinsic viscosity is preferably 0.80 dL/g or less, more preferably 0.76 dL/g or less, and particularly preferably 0.74 dL/g or less. When the intrinsic viscosity is within the above range, the resulting resin will have a sufficient fluidity, and a good formability by a material extrusion-type 3D printer. On the other hand, the aromatic polyester resin preferably has an intrinsic viscosity of 0.60 dL/g or more, more preferably 0.62 dL/g or more, and still more preferably 0.64 dL/g or more. This is because, although the lower limit of the intrinsic viscosity is not particularly limited, too low an intrinsic viscosity tends to result in an insufficiency in the mechanical strength, such as impact resistance, of the resulting molded article.

The intrinsic viscosity of the aromatic polyester resin can be controlled by adjusting the polymerization conditions and the like during the production.

The MFR and the intrinsic viscosity of the aromatic polyester resin are measured by the methods described in Examples to be described later.

In another embodiment, the aromatic polyester resin contains, as dicarboxylic acid units, terephthalic acid units and isophthalic acid units. In this embodiment, the contents of terephthalic acid units and isophthalic acid units included in the aromatic polyester resin are not particularly limited.

The aromatic polyester resin contains terephthalic acid units usually in an amount of 50 mol % or more, and preferably 60 mol % or more, and at the same time, usually in an amount of 100 mol % or less, and preferably 97 mol % or less, with respect to the total amount of dicarboxylic acid units.

The aromatic polyester resin contains isophthalic acid units usually in an amount of 3 mol % or more, and preferably 10 mol % or more, and at the same time, usually in an amount of 50 mol % or less, and preferably 40 mol % or less, with respect to the total amount of dicarboxylic acid units.

The aromatic polyester resin in this embodiment can be obtained by using terephthalic acid and isophthalic acid as raw material dicarboxylic acids. Note that, for the details regarding the aromatic polyester resin in this embodiment, the description of the aromatic polyester resin in the previously described embodiment can be referred to.

[Filament for Material Extrusion-Type 3D Printer]

The filament for a material extrusion-type 3D printer according to the present embodiment contains the above described aromatic polyester resin. However, the filament may contain any of other resins other than the above described aromatic polyester resin, and other additives, to the extent that the object of the present invention is not impaired. Further, the filament for a material extrusion-type 3D printer may contain only one kind of the above described aromatic polyester resin, or may contain two or more kinds thereof varying in copolymerization composition or physical properties.

Examples of the other resins include polyolefin resins, polyester resins other than the above described aromatic polyester resin, polyamide resins, styrene resins, acrylic resins, polycarbonate resins, polyvinyl chloride resins, various types of elastomers, and the like. These resins may be used singly, or in combination of two or more kinds thereof. The amount of the other resin(s) to be incorporated is usually 50 mass % or less, and preferably 30 mass % or less, with respect to the total amount of components.

Examples of the additives include antioxidants, acidic compounds and derivatives thereof, lubricants, UV absorbers, photostabilizers, nucleating agents, flame retardants, impact modifiers, foaming agents, coloring agents, organic peroxides, inorganic additives for increasing the frictional resistance, spreading agents, pressure sensitive adhesives, and the like. These additives may be used singly, or in combination of two or more kinds thereof.

Examples of fillers include: inorganic fillers such as talc, calcium carbonate, zinc carbonate, wollastonite, silica, alumina, magnesium oxide, calcium silicate, sodium aluminate, calcium aluminate, sodium aluminosilicate, magnesium silicate, glass balloons, cut glass fibers, milled glass fibers, glass flakes, glass powders, silicon carbide, silicon nitride, gypsum, gypsum whiskers, calcined kaolin, carbon black, zinc oxide, antimony trioxide, zeolite, hydrotalcite, metal fibers, metal whiskers, metal powders, ceramic whiskers, potassium titanate, boron nitride, graphite, and carbon fibers; organic fillers including naturally derived polymers, such as starch, cellulose microparticles, wood flour, soybean curd refuse, rice husks and wheat brans, and modified products thereof; and the like. These fillers may be used singly, or in combination of two or more kinds thereof. The amount of the filler(s) to be incorporated is usually 50 mass % or less, and preferably 30 mass % or less, with respect to the total amount of components.

The filament for a material extrusion-type 3D printer is produced by using an aromatic polyester resin composition obtained by melt blending the above described aromatic polyester resin, and any of the other resins and additives incorporated as necessary.

The method of producing the filament for a material extrusion-type 3D printer is not particularly limited. In general, the filament can be obtained by a method in which the above described aromatic polyester resin or the aromatic polyester resin composition is formed into a filament by a known forming method such as extrusion molding, or by a method in which the resin composition is directly formed into a filament during the production of the resin composition. For example, in cases where the filament is formed by extrusion molding, the formation is carried out usually at a temperature of from 80 to 250° C., and preferably from 100 to 240° C.

The diameter of the filament varies depending on the performance of the system used. However, the filament preferably has a diameter of from 1.0 to 5.0 mm, and more preferably from 1.3 to 3.5 mm. Further, regarding the accuracy of the diameter of the filament, it is preferred that the error at an arbitrary measurement point be within the range of ±5%, in terms of stably feeding the raw material.

When a resin molded article is produced by a material extrusion-type 3D printer, using the filament for a material extrusion-type 3D printer according to the present embodiment, it is required that the filament for a material extrusion-type 3D printer can be stably stored, and the filament for a material extrusion-type 3D printer can be stably fed to a material extrusion-type 3D printer. In order to satisfy the above described requirements, the filament for a material extrusion-type 3D printer is preferably formed into a roll wound about a bobbin and stored in a sealed package, so as to allow for a long-term storage, stable delivery, protection against environmental factors such as humidity, protection against twisting, and the like. Alternatively, the filament for a material extrusion-type 3D printer or a roll of the filament is preferably housed within a container such as a cartridge. The container such as a cartridge may be, for example, a container which is capable of housing the filament or a roll of the filament wound about a bobbin, which is provided with a moisture-proof material or a moisture absorbing material in the interior thereof, and which has a sealed structure except for an orifice portion through which the filament is delivered.

A roll of filament obtained by winding the filament for a material extrusion-type 3D printer about a bobbin, or a cartridge including the filament or the roll of the filament, is usually disposed inside or periphery of a material extrusion-type 3D printer, and the filament is continuously fed to the material extrusion-type 3D printer, during the formation of a resin molded article.

[Resin Molded Article]

A resin molded article is produced by a material extrusion-type 3D printer, using the filament for a material extrusion-type 3D printer according to the present embodiment. Specific examples of the material extrusion-type 3D printer include the above described FDM-based 3D printers.

A FDM-based 3D printer generally includes a chamber; and further includes within the chamber: a heatable substrate, an extrusion head disposed on a gantry structure, a heat melting device, and a raw material feeding unit including a filament guide, a filament cartridge mounting portion, and the like. In some of the FDM-based 3D printers, the extrusion head and the heat melting device are provided integrally.

By disposing the extrusion head on the gantry structure, the extrusion head can be moved to an arbitrary position on the X-Y plane of the substrate. The substrate is a platform for constructing thereon a three-dimensional object of interest, a supporting material, and the like. The substrate is preferably configured such that it can be heated and kept heated to obtain adhesion to a laminated product in close contact, and that the dimensional stability of the resulting resin molded article can be improved to obtain a desired three-dimensional object. The extrusion head and the substrate are usually configured such that at least one of them is movable in the direction of Z axis, which is perpendicular to the X-Y plane.

The filament for a material extrusion-type 3D printer according to the present embodiment is delivered from the raw material feeding unit, and transferred to the extrusion head by an opposed pair of rollers or gears. The filament is then heat melted at the extrusion head, to be extruded through a tip nozzle. According to the signals generated based on a CAD model, the extrusion head supplies the raw material on the substrate while moving its position, to continuously deposit the raw material on the substrate in layers. After the completion of this step, the resulting layered deposit is removed from the substrate, followed by peeling of the support material or the like and ablation of unnecessary portions, as necessary, thereby obtaining a resin molded article, as a desired three-dimensional object.

Examples of means for continuously feeding the raw material to the extrusion head include: a method of delivering and feeding a filament; a method of feeding a powder or a liquid from a tank or the like via a weigh feeder; a method of feeding an extrudate obtained by plasticizing pellets or granules by an extruder or the like followed by extruding the resultant; and the like. In terms of the ease of step and the feeding stability, the method of delivering and feeding a filament, namely, the method of delivering and feeding the above described filament for a material extrusion-type 3D printer is most preferred.

When the filament is fed to a material extrusion-type 3D printer, the filament is usually allowed to engage with drive rolls, such as nip rolls or gear rolls, to be delivered and fed to the extrusion head at the same time. At this time, it is also preferred that the surface of the filament be provided with minute irregularities transferred thereon, in order to stabilize the feeding of the raw material by enhancing the gripping of the filament due to the engagement between the drive rolls and the filament. Furthermore, it is also preferred that an inorganic additive, a spreading agent, a pressure sensitive adhesive, a rubber or the like be incorporated into the filament, in order to increase the frictional resistance against the engaging portion.

The aromatic polyester resin in the present embodiment is able to provide fluidity suitable for extrusion, usually at a temperature of about from 190 to 240° C., which is a temperature to which a common material extrusion-type 3D printer can be adjusted to. In the method of producing a resin molded article, the temperature of the heat-extrusion head is preferably set to 200 to 230° C., and the temperature of the substrate may be set at room temperature, but usually set at 80° C. or lower, and preferably from 10 to 70° C., to stably produce a resin molded article.

The temperature of the molten resin discharged from the extrusion head (discharge temperature) is preferably 180° C. or higher, and more preferably 190° C. or higher; and on the other hand, the temperature is preferably 250° C. or lower, more preferably 240° C. or lower, and still more preferably 220° C. or lower. The temperature of the molten resin is preferably equal to or higher than the above mentioned lower limit value, in terms of extruding a resin having a high heat resistance, and also in terms of preventing the deterioration of appearance due to so-called cobwebbing, a phenomenon in which finely stretched strands of molten resin remain in the resulting molded product. On the other hand, the temperature of the molten resin is preferably equal to or lower than the above mentioned upper limit value, because the occurrence of problems such as thermal decomposition or burning of the resin, smoke emission, odor, and stickiness can be easily prevented, and in addition, the resin can be discharged at a high velocity, thereby tends to improve the forming efficiency.

In order to shorten the time required for producing a resin molded article, a material extrusion-type 3D printer is preferably operated at a higher printing speed, and the printing speed is preferably 20 mm/sec or more, more preferably 30 mm/sec or more, and still more preferably 50 mm/sec or more. However, the upper limit of the printing speed is usually 200 mm/sec, because too high a printing speed may cause deterioration in the formability or the transparency of the resulting resin molded article.

The molten resin discharged from the extrusion head is preferably discharged in the form of a strand having diameter of from 0.01 to 1.0 mm, and more preferably from 0.02 to 0.8 mm. When the molten resin is discharged in such a shape, the reproducibility of a CAD model tends to be improved, and therefore preferred.

When the resin discharged from the extrusion head of a material extrusion-type 3D printer, in the form of a strand, is laminated to form a resin molded article, there are cases where the viscosity of the molten resin is increased to cause occlusion at the nozzle portion of the extrusion head, and thereby failing to stably extrude the resin. However, since an increase in the viscosity due to heat melting does not occur in the aromatic polyester resin in the present embodiment, it is possible to stably produce a resin molded article, without the occurrence of such a problem.

A resin molded article produced by a material extrusion-type 3D printer, using the filament for a material extrusion-type 3D printer according to the present embodiment, has a high transparency, is capable of being imparted with high design properties by coloring with a coloring agent(s), and has excellent surface characteristics and appearance. Therefore, the filament can be suitably used in applications such as: stationeries; toys; covers for mobile phones and smartphones and the like; parts such as grips; teaching materials for use in schools, consumer electronics, repair parts for office automation equipment, various types of parts for automobiles, motorcycles, bicycles and the like; materials for electric and electronic devices, farming materials, horticultural materials, fishing materials, civil engineering and construction materials, medical supplies and the like.

EXAMPLES

The present invention will now be described in further details, with reference to Examples and Comparative Example. However, the following Examples and Comparative Example are provided for a detailed description of the present invention, and the present invention is not limited by the following Examples, unless it contradicts the gist of the invention.

In each of the following Examples and Comparative Example, an aromatic polyester resin which includes terephthalic acid units and isophthalic acid units as dicarboxylic acid units was produced, and the evaluation thereof was carried out. In the following description, the ratio of the amount of isophthalic acid units with respect to the total amount of dicarboxylic acid units is referred to as the "isophthalic acid composition". Note that it has been confirmed that the ratio of the amount of isophthalic acid with respect to the amount of the dicarboxylic acid component in the raw materials charged, is roughly the same as the isophthalic acid composition in the resulting aromatic polyester resin, by analyzing the composition of the aromatic polyester resin obtained in Example 2 to be described later, by $^1$H-NMR spectroscopy.

The composition, the MFR, and the intrinsic viscosity (IV) of each aromatic polyester resin are measured according to the following methods.

<Composition: $^1$H-NMR Measurement>

A quantity of from 13 to 25 mg of aromatic polyester resin pellets is weighed, and dissolved in 1 ml of a solution of $CDCl_3$ (deuterated chloroform)/HFIP (hexafluoroisopropanol)=7/3 (v/v), followed by adding thereto 25 μL of deuterated pyridine. The resultant is then transferred to an NMR test tube having an outer diameter of 5 mm. The $^1$H-NMR spectrum of the resulting solution was measured, using AVANCE 400 spectrometer manufactured by Bruker Corporation. The measurement was carried out under the following conditions: a resonance frequency of 400.1 MHz, a flip angle of 45°, a data acquiring time of four seconds, a pulse repeating time of 10 seconds, a cumulative number of 64 times, and a temperature of room temperature. TMS signal at 0.00 ppm was used as a standard for chemical shift. From the integral values thereby obtained, the amounts of isophthalic acid, terephthalic acid, diethylene glycol, and dicyclohexanedimethanol were calculated.

<MFR>

The measurement of MFR was carried out in accordance with JIS K7210 (1999), at a measurement temperature of 230° C., and a measurement load of 2.16 kgf.

<Intrinsic Viscosity (IV)>

A sample of the aromatic polyester resin in an amount of about 0.25 g was dissolved in about 25 mL of mixed liquid of phenol/1,1,2,2-tetrachloroethane (mass ratio: 1/1) to a concentration of 1.00 g/dL, then the resultant was cooled to 30° C., and maintained at this temperature. Thereafter, the period of time (in seconds) required to fall was measured for each of the resulting sample solution and the solvent alone, using a fully-automated solution viscometer ("2CH-type, DT504"; manufactured by Chuorika Co., Ltd.). The intrinsic viscosity was calculated based on the following equation:

$$IV=((1+4K_H \cdot \eta sp)^{0.5}-1)/(2K_H \cdot C)$$

In the above equation, $\eta sp=\eta/\eta 0-1$, and $\eta$ indicates the period of time (in seconds) required to fall of the sample solution, $\eta 0$ indicates that of the solvent alone, and C indicates the concentration (g/dL) of the sample solution, and $K_H$ indicates the Huggins' constant. A value of 0.33 was used as $K_H$. Note that the sample was dissolved at a temperature of 110° C. for 30 minutes.

The spinnability in the production of a filament for a material extrusion-type 3D printer from the aromatic polyester resin; the formability in the production of a resin molded article from the filament for a material extrusion-type 3D printer, by a material extrusion-type 3D printer; and the transparency of the resulting resin molded article; were evaluated as follows.

<Spinnability>

When it was possible to stably extrude the aromatic polyester resin from a twin screw kneading extruder, to continuously produce a filament with a small variation in diameter (error within the range of ±5%), the spinnability was evaluated as good: "o"; whereas when the produced filament had a large variation in diameter, and it was unable to continuously produce the filament, the spinnability was evaluated as poor: "×".

<Formability>

When it was possible to form a resin molded article having an intended shape, by a material extrusion-type 3D printer, the formability was evaluated as "o"; when it was unable to form a resin molded article having an intended shape, the formability was evaluated as "Δ"; and when it was unable to form a resin molded article having an intended shape, and it was impossible to avoid interrupting the formation, the formability was evaluated as "x".

<Transparency of Resin Molded Article>

In the formation of a test pattern, a 10 mm-thick plate-like portion of the resulting resin molded article was placed on a paper (paper for copying) on which 10-point letters had been printed in black. Then, it was visually observed if the letters could be read through the plate-like portion, and the transparency was evaluated in the following five stages.

When the letters could be read very clearly, the transparency was evaluated as good: "5", when the letters could not be read at all, the transparency was evaluated as poor: "1", and the results therebetween were evaluated as "4", "3", and "2" depending on the clarity of the letters.

Example 1

<Production of Aromatic Polyester Resin>

Into a 0.5 L cylindrical glass container, terephthalic acid (90.7 g, 0.55 mol) and isophthalic acid (hereinafter, referred to as "IPA") (38.8 g, 0.23 mol) as the dicarboxylic acid component, and ethylene glycol (hereinafter, referred to as "EG") (58.1 g, 0.94 mol) as the diol component were charged, and an esterification reaction was allowed to proceed. The isophthalic acid composition in the raw materials charged is 30 mol %, and the molar ratio of the diol component to the dicarboxylic acid component is 1.2. Diantimony trioxide in amount of 200 ppm by mass with respect to the amount of polyester to be obtained, was added to the resultant as an EG solution, and the esterification reaction was allowed to proceed at a temperature of 250° C. and a pressure of 200 kPaG (G indicates that kPa is a relative pressure with respect to the atmospheric pressure), for a reaction time of three hours. After the completion of the esterification reaction, 200 ppm by mass of diantimony trioxide and 58 ppm by mass of orthophosphoric acid, with respect to the amount of polyester to be obtained, were added to the resultant, each as an EG solution. The temperature of the resultant was gradually increased from 250° C. to 280° C., and at the same time, the pressure was gradually reduced from normal pressure to 66 PaA (A indicates that kPa is an absolute pressure). Under a reduced pressure of 66 PaA, a polycondensation reaction was allowed to proceed for five hours, and the resultant was discharged in the form of strands, followed by cutting with a cutter while cooling with water, to be formed into pellets.

The MFR and the intrinsic viscosity (IV) of the resulting aromatic polyester resin were measured, and the results are shown in Table 1.

<Production of Filament>

The aromatic polyester resin obtained as described above was introduced into a twin screw kneading extruder with a screw diameter of 15 mm, to produce a filament.

The twin screw kneading extruder was set at a temperature of 240° C. and a discharge amount of 1.0 kg/hr, and the aromatic polyester resin was extruded through a die with a diameter of 3 mm. The extruded resin was allowed to pass through a water tank controlled at 65° C., and then taken up by a take-up device at a rate of 5 m/min.

The diameter of the cross section of the resulting filament was about from 1.70 to 1.80 mm.

The evaluation result of the spinnability is shown in Table 1.

<Production of Resin Molded Article>

Using "Blade-1" manufactured by Hotproceed or "Idea Werk" manufactured by Shenzhen Weistek Co., Ltd., as a FDM-based material extrusion-type three-dimensional printer, resin molded articles having shapes as shown in Table 1 were formed as three-dimensional objects. The production was carried out at standard mode, a printing speed of 60 mm/sec or 40 mm/sec, a substrate temperature of room temperature, and a discharge temperature of 215° C. or 230° C. The molten resin was discharged from the extrusion head in the shape of a strand having a diameter of 0.4 mm. The evaluation results of the formability at this time and the transparency of the resulting resin molded articles are shown in Table 1.

Example 2

Into a 0.5 L cylindrical glass container, terephthalic acid (111.4 g, 0.67 mol) and IPA (18.1 g, 0.11 mol) as the dicarboxylic acid component, and EG (58.1 g, 0.94 mol) as the diol component were charged, and an esterification reaction was allowed to proceed. The isophthalic acid composition in the raw materials charged is 14 mol %, and the molar ratio of the diol component to the dicarboxylic acid component is 1.2. The esterification reaction was allowed to proceed without using any catalyst, at a temperature of 250° C. and a pressure of 200 kPaG, for a reaction time of three hours. After the completion of the esterification reaction, 130 ppm by mass of germanium dioxide and 140 ppm by mass of orthophosphoric acid, with respect to the amount of polyester to be obtained, were added to the resultant, each as an EG solution. The temperature of the resulting solution was gradually increased from 250° C. to 280° C., and at the same time, the pressure was gradually reduced from normal pressure to 66 PaA. Under a reduced pressure of 66 PaA, a polycondensation reaction was allowed to proceed for five hours, and the resultant was discharged in the form of strands, followed by cutting with a cutter while cooling with water, to be formed into pellets. The resulting aromatic polyester resin was pre-crystallized at 100° C. for eight hours under a nitrogen atmosphere, and then subjected to a solid phase polymerization in an inert oven (INERT OVEN IPHH 201, manufactured by TABAI ESPEC Corp.) under a nitrogen stream at 180° C. for four hours, to obtain an aromatic polyester resin. A filament and resin molded articles were produced in the same manner as in Example 1, and the evaluation results thereof are shown in Table 1.

Further, the filament obtained in Example 2 was analyzed by $^1$H-NMR spectroscopy. The thus obtained $^1$H-NMR spectrum chart is shown in the FIGURE and the composition of the aromatic polyester resin is shown in Table 2.

Example 3

The production of an aromatic polyester resin, the production of a filament and resin molded articles were carried out in the same manner as in Example 2, except that the solid phase polymerization was carried out for 16 hours. The evaluation results are shown in Table 1.

Example 4

The production of an aromatic polyester resin, the production of a filament and resin molded articles were carried out in the same manner as in Example 2, except that, in the production of the aromatic polyester resin, the isophthalic acid composition in the raw materials charged was adjusted to 12 mol %, and the solid phase polymerization was carried out for 20 hours. The evaluation results are shown in Table 1.

Example 5

The production of an aromatic polyester resin, the production of a filament and resin molded articles were carried out in the same manner as in Example 2, except that, in the production of the aromatic polyester resin, the isophthalic acid composition in the raw materials charged was adjusted to 5.4 mol %, and the solid phase polymerization was not carried out. The evaluation results are shown in Table 1.

Comparative Example

The production of resin molded articles was carried out in the same manner as in Example 1, except that t-glase (made of a PET resin) manufactured by Taulman 3D was used as a filament. The evaluation results are shown in Table 1.

Further, the filament used in Comparative Example was analyzed by $^1$H-NMR spectroscopy. As a result, in the filament used in Comparative Example, terephthalic acid alone was detected as the dicarboxylic acid component, and isophthalic acid was not detected.

TABLE 1

| | | | Examples | | | | | Comparative |
|---|---|---|---|---|---|---|---|---|
| | | | 1 | 2 | 3 | 4 | 5 | Example |
| Aromatic polyester resin | | Isophthalic acid composition (mol %) | 30 | 14 | 14 | 12 | 5.4 | Taulman t-glase Filament |
| | | MFR (g/10 min) | 20 | 15 | 5 | 6 | N.T. | |
| | | Intrinsic viscosity (IV) (dL/g) | 0.73 | 0.72 | 0.89 | 0.81 | 0.74 | |
| | | Spinnability | ○ | ○ | ○ | ○ | ○ | |
| | | | Molded article production conditions | | | | | |
| FDM-based 3D printer | Three-dimensional object | | Printing speed (mm/sec) | Discharge temperature (° C.) | | | | |
| Formability | Blade-1 | Box-shaped test pattern | 60 | 215 | ○ | ○ | ○ | ○ | ○ | *1 |
| | | Helical | | | ○ | ○ | ○ | x | ○ | *1 |
| | | Vase | | | ○ | ○ | ○ | ○ | ○ | *1 |
| | Idea Werk | Rose | | | ○ | ○ | x | x | ○ | *1 |
| | | Transparency | | | 1 | 5 | 5 | 5 | 3 | *1 |
| Formability | Blade-1 | Box-shaped test pattern | 60 | 230 | ○ | ○ | ○ | ○ | ○ | x |
| | | Helical | | | ○ | ○ | ○ | ○ | ○ | x |
| | | Vase | | | ○ | ○ | ○ | ○ | ○ | x |
| | Idea Werk | Rose | | | ○ | ○ | ○ | ○ | ○ | x |
| | | Transparency | | | 1 | 4 | 4 | 4 | 3 | 3 |
| Formability | Blade-1 | Box-shaped test pattern | 40 | 230 | ○ | ○ | ○ | ○ | ○ | Δ |
| | | Helical | | | ○ | ○ | ○ | ○ | ○ | Δ |
| | | Vase | | | ○ | ○ | ○ | ○ | ○ | Δ |
| | Idea Werk | Rose | | | ○ | ○ | ○ | ○ | ○ | Δ |
| | | Transparency | | | 1 | 4 | 4 | 4 | 3 | 3 |

*1: Unable to produce a resin molded article, since the filament does not melt at 215° C.
N.T.: Not Tested

TABLE 2

| | Ratio of the amount of terephthalic acid units with respect to the total amount of carboxylic acid units | Ratio of the amount of isophthalic acid units with respect to the total amount of carboxylic acid units | Ratio of the amount of ethylene glycol units with respect to the total amount of diol units | Ratio of the amount of diethylene glycol units with respect to the total amount of diol units | unit: mol %<br>Ratio of the amount of cyclohexanedimethanol units with respect to the total amount of diol units |
|---|---|---|---|---|---|
| Analysis of filament of Example 2 | 85.8 | 14.2 | 96.9 | 3.1 | n.d. | n.d.: not detected

It can be seen from the results shown in Table 1 that the filament for a material extrusion-type 3D printer according to the present embodiment allows for stably producing a transparent resin molded article having an intended shape, using a FDM-based 3D printer, with a good formability.

The aromatic polyester resins prepared in Examples 3 and 4 have a low MFR, and in cases where the formation of a resin molded article is carried out at a discharge temperature of 215° C. and a printing speed of 60 mm/sec, the formability is deteriorated, and there are cases where a resin molded article cannot be formed depending on the shape of the three-dimensional object to be formed. However, in cases where the formation is carried out at a discharge temperature of 230° C. and a printing speed of 40 mm/sec, or at a discharge temperature of 230° C. and a printing speed of 60 mm/sec, it is possible to stably produce a transparent resin molded article having an intended shape.

In contrast, in cases where a filament composed of an aromatic polyester resin containing no isophthalic acid unit is used to produce a resin molded article by a FDM-based 3D printer, the formability is deteriorated.

The invention claimed is:

1. A filament for a material extrusion-type three-dimensional printer, the filament comprising:
    an aromatic polyester resin containing 50 mol % or more of aromatic dicarboxylic acid units, and 3 mol % or more of isophthalic acid units, with respect to the total amount of dicarboxylic acid units, wherein
    the aromatic polyester resin has a melt flow rate (230° C., 2.16 kgf) of 7 g/10 min or more and 100 g/10 min or less.

2. The filament for a material extrusion-type three-dimensional printer according to claim 1,
    wherein the aromatic polyester resin comprises 50 mol % or more of ethylene glycol units with respect to the total amount of diol units.

3. The filament for a material extrusion-type three-dimensional printer according to claim 1,
    wherein the aromatic polyester resin comprises 3 mol % or more and 50 mol % or less of isophthalic acid units with respect to the total amount of dicarboxylic acid units.

4. The filament for a material extrusion-type three-dimensional printer according to claim 1,
    wherein the aromatic polyester resin has an intrinsic viscosity of 0.80 dL/g or less.

5. The filament for a material extrusion-type three-dimensional printer according to claim 1,
    wherein the filament has a diameter of 1.0 mm or more and 5.0 mm or less.

6. A roll of filament obtainable by winding the filament for a material extrusion-type three-dimensional printer according to claim 1.

7. A cartridge for a material extrusion-type three-dimensional printer, the cartridge comprising:
    a container; and
    the filament for a material extrusion-type three-dimensional printer according to claim 1 housed within the container.

8. A cartridge for a material extrusion-type three-dimensional printer, the cartridge comprising:
    a container; and
    the roll of filament according to claim 6 housed within the container.

9. A filament for a material extrusion-type three-dimensional printer, the filament comprising:
    an aromatic polyester resin containing terephthalic acid units and isophthalic acid units as dicarboxylic acid units, wherein
    wherein the aromatic polyester resin has a melt flow rate (230° C., 2.16 kgf) of 7 g/10 min or more and 100 g/10 min or less.

10. The filament for a material extrusion-type three-dimensional printer according to claim 9,
    wherein the aromatic polyester resin comprises ethylene glycol units as diol units.

11. The filament for a material extrusion-type three-dimensional printer according to claim 1,
    wherein the aromatic polyester resin comprises 12 mol % or more and 50 mol % or less of isophthalic acid units with respect to the total amount of dicarboxylic acid units.

* * * * *